(12) United States Patent
Laffont

(10) Patent No.: US 10,001,065 B2
(45) Date of Patent: Jun. 19, 2018

(54) CONTROL CONCEPT FOR CLOSED LOOP BRAYTON CYCLE

(71) Applicant: ALSTOM Technology Ltd, Baden (CH)

(72) Inventor: Patrick Laffont, Antony (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 120 days.

(21) Appl. No.: 15/139,003

(22) Filed: Apr. 26, 2016

(65) Prior Publication Data

US 2016/0319749 A1 Nov. 3, 2016

(30) Foreign Application Priority Data

Apr. 29, 2015 (EP) ..................... 15290114

(51) Int. Cl.

| | |
|---|---|
| F02C 9/16 | (2006.01) |
| F02C 9/20 | (2006.01) |
| F01D 17/14 | (2006.01) |
| F02C 1/10 | (2006.01) |
| F01D 5/02 | (2006.01) |

(Continued)

(52) U.S. Cl.
CPC .................. *F02C 9/16* (2013.01); *F01D 5/02* (2013.01); *F01D 17/145* (2013.01); *F01D 17/148* (2013.01); *F01K 5/00* (2013.01); *F02C 1/105* (2013.01); *F02C 9/20* (2013.01); *F04D 29/321* (2013.01); *F02G 2250/03* (2013.01); *F05D 2260/20* (2013.01); *F05D 2260/606* (2013.01); *F05D 2270/021* (2013.01); *F05D 2270/091* (2013.01); *F05D 2270/304* (2013.01); *F05D 2270/3061* (2013.01)

(58) Field of Classification Search
CPC .... F02C 1/105; F02C 9/16; F02C 9/20; F01D 17/145; F01D 17/146; F01D 17/148; F02G 2250/03
See application file for complete search history.

(56) References Cited

U.S. PATENT DOCUMENTS

| | | | |
|---|---|---|---|
| 3,630,022 A | 12/1971 | Jubb | |
| 5,148,670 A * | 9/1992 | Birch | ...................... F02C 6/006 60/39.41 |

(Continued)

FOREIGN PATENT DOCUMENTS

| | | |
|---|---|---|
| WO | 98/37312 A1 | 8/1998 |
| WO | 03/034443 A1 | 4/2003 |

*Primary Examiner* — Audrey K Bradley
(74) *Attorney, Agent, or Firm* — GE Global Patent Operation; Cynthia W. Flanigan

(57) ABSTRACT

An improved closed loop Brayton cycle for a power plant is provided that includes a heater, at least one turbine, a recuperator, at least one cooler, at least one compressor, a bypass line and a flap valve arrangement in a closed circuit in which working fluid is circulated to produce electricity via a generator. Depending upon the requirement, such as, in case of gird load disconnection, speed of a shaft-line to which the turbine, the compressor and the generator are configured is also required to be reduced without any impact on the pressure drop in the cycle. For that the non-tight flap valve arrangement is configured on each conduit between the heater and the at least one turbine in a closest possible proximity to each turbine inlet.

8 Claims, 3 Drawing Sheets

(51) Int. Cl.
*F04D 29/32* (2006.01)
*F01K 5/00* (2006.01)

(56) References Cited

U.S. PATENT DOCUMENTS

| | | | |
|---|---|---|---|
| 2007/0044480 A1* | 3/2007 | Uselton | F02C 6/18 60/784 |
| 2012/0109581 A1* | 5/2012 | Regal | F01K 13/02 702/183 |
| 2014/0102098 A1 | 4/2014 | Bowan et al. | |
| 2014/0102101 A1* | 4/2014 | Xie | F01K 25/103 60/647 |
| 2014/0103661 A1* | 4/2014 | Kacludis | F02C 1/04 290/54 |
| 2016/0053638 A1* | 2/2016 | Stapp | F28F 9/001 60/650 |

* cited by examiner

CONTROL CONCEPT FOR CLOSED LOOP BRAYTON CYCLE

CROSS-REFERENCE TO RELATED APPLICATIONS

This application claims priority to European Patent Application No. 15290114.6 filed Apr. 29, 2015, the contents of which are hereby incorporated in its entirety.

TECHNICAL FIELD

The present disclosure relates generally to a closed loop Brayton cycle and, more particularly, to an improved control concept for closed loop Brayton cycle with particular advantage of controlling the gas flow in such cycle during generator disconnection from grid.

BACKGROUND

It is known to convert the heat into electricity in closed Brayton cycle power plant in which the working fluid is gas.

In one such known closed Brayton cycle power plant cycle 10, as shown in prior art FIG. 1, includes at least one compressor 1 and turbines 2 on a shaft 3, coolers 4, a recuperator 5 and a heater 6 arranged in a closed loop cycle to operate and produce the electricity via a generator 7 (that is also configured on the shaft 3) to transfer to the grid. Such cycle also includes a bypass control arrangement 8 around the compressor and an inventory system 9 arranged in the cycle 10. However, efficiency of the cycle 10 is very sensitive to pressure drop and therefore requires proper attentions while doing so.

During slow power variation in the grid, the grid load variation is compensated by adding or removing gas in the cycle by the inventory system 9. Gas is removed from the closed loop and stored in the inventory system 9 to reduce load. Gas is taken from the inventory system 9 and injected in the closed loop to increase load. By changing gas mass in the closed loop it is possible to change gas density and therefore mass flow i.e. power. However, these changes are slow.

Further, in case of sudden substantive decrease in grid load, the generator 7 is disconnected from the grid. Suddenly, the resistive torque of the generator 7 is removed. But since the inventory system 9 is too slow to reduce the turbine 2 torque, as a consequence, the balance between driving torque from the turbine 2 and resistive torque from the generator 7 is positive, i.e. the shaft line 3 will accelerate and its rotation speed will increase dangerously, which may burst the rotor, if not taken care. Usually in this case, the by-pass control arrangement 8 is opened connecting the compressor discharge to the compressor inlet, which increases the power needed by the compressor 1 (resistive torque) and thus reducing the power unbalance between turbine 2 and generator 7 and compressor 1. The high pressure volume of the cycle 10 is deflated to reach an equilibrium pressure in the cycle thus reducing the driving torque of the turbine 2.

Accordingly, there exists a need for better and fast control of the gas flow to a turbine which eliminates the foregoing disadvantages.

SUMMARY

The present disclosure discloses an improved the control of a closed loop Brayton cycle that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

A general object of the present discloser is to provide an improved closed loop Brayton cycle which may be adapted for use in various systems, such as a gas-cooled nuclear reactor system, solar operated system, fossil fuel operated system etc. Further, an object of the present disclosure is to describe improved control concept for a closed loop Brayton cycle that may be capable of better and rapid control of the gas flow to a turbine and with a marginal impact on pressure drop i.e. closed loop Brayton cycle efficiency. In a variant, it may be possible to reduce significantly the size of the by-pass valves.

In one aspect of the present disclosure, an improved control concept of a closed loop Brayton cycle for a power plant is provided. The cycle may include a working fluid flowing therein for operation of the power plant. In an exemplary arrangement, the cycle may include a heater, at least one turbine, a recuperator, at least one cooler, at least one compressor, a bypass line, an inventory control system and a non-tight flap valve arrangement. The heater may be adapted to supply heat to the working fluid flowing in the cycle, and includes an inlet and an outlet. The turbine may be operable on the expansion of the compressed heated working fluid, and drivingly connected to a variable load via a shaft-line. Each of the at least one turbine may include an inlet and an outlet. Each inlet of the at least one turbine may be connected to the outlet of the heater via a conduit.

Further, the recuperator may be adapted to be connected to the turbine via the outlet to receive expanded working fluid to cool thereto. The recuperator may further be connected to the heater via the inlet of the heater. Further, the cooler may be connected to the recuperator to further cool the working fluid. Furthermore, the compressor on the shaft-line which may be driven by the at least one turbine may be connected to the cooler to receive and compress the working fluid to transfer to the recuperator. The recuperator heats the compressed working fluid by the expanded working fluid received from the turbine and supply thereto to the heater.

The turbine may be operable to produce power to run the variable load generator and the compressor arrangement for operation of the cycle and to supply electricity to a grid depending upon the load requirement. However, the turbine is also required to be protected when there is sudden change/decrease in the grid load as in such scenario there is sudden disconnection of the variable load generator from the grid resulting the very high speed turbine and subsequently damage thereof.

Such target may be obtained by the non-tight flap valve arrangement by reducing the amount of working fluid flowing through the circuit. The non-tight flap valve arrangement may be configured on the each conduit between the heater and the at least one turbine in a closest possible proximity to each turbine inlet to manage the mass flow of working fluid through the non-tight flap valve arrangement to control the shaft-line speed, when generator is disconnected from the grid.

In accordance with the embodiment, the conduit may include a recess where the flap valve arrangement may be adapted to be housed in the recess, to substantially minimize pressure drop in the cycle upon normal operation.

In accordance with the embodiment, the non-tight flap valve arrangement includes a flap member and an attaching segment. The attaching segment may include a flap axle which may be pivotally attached to the flap member. The attaching segment may be capable of enabling the attachment of the non-tight flap valve arrangement on the conduit in the recess. In accordance with the embodiment, the flap member, at an open position completely covers the recess and allows the working fluid to fully flow from the conduit to the at least one turbine. Further, in an embodiment, the flap member at a closed position is non-tight, which allows the conduit to be partially closed to enable the adjustment of the mass flow of working fluid to admit from the conduit to the at least one turbine.

In accordance with the embodiment, the flap member may be shaped to correspond the shape of the conduit, to substantially minimize pressure drop in the cycle upon normal operation.

In accordance with the embodiment, the non-tight flap valve arrangement 190 may be self-closing non-tight flap valve arrangement that may adapted to be partially closed in responsive to disconnection of generator from the grid.

In accordance with the embodiment, the self-closing non-tight flap valve arrangement may be controlled using an electronic module.

In accordance with the embodiment, the cycle may further include a covering arrangement adapted to cover the recess and the non-tight flap valve arrangement and block exiting of the working fluid from the cycle.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms used herein do not denote any order, elevation or importance, but rather are used to distinguish one element from another. Further, the terms "a," "an," and "plurality" herein do not denote a limitation of quantity, but rather denote the presence of at least one of the referenced item.

Figure 1:
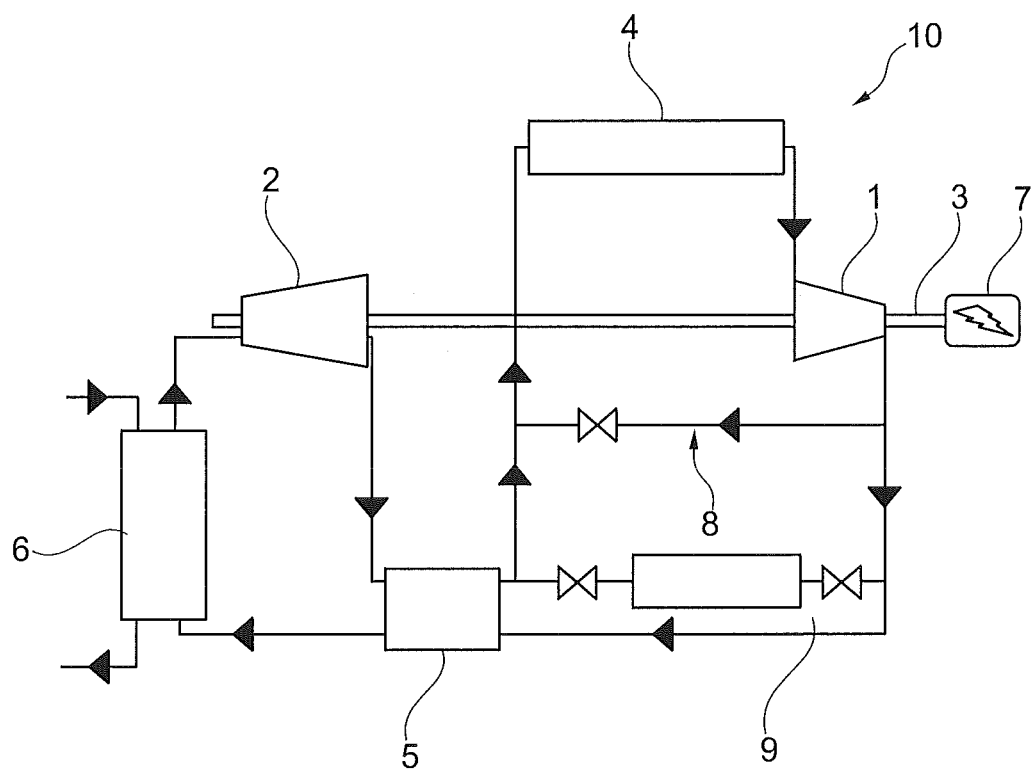
FIG. 1 depicts a conventional closed loop Brayton cycle.
Figure 2:
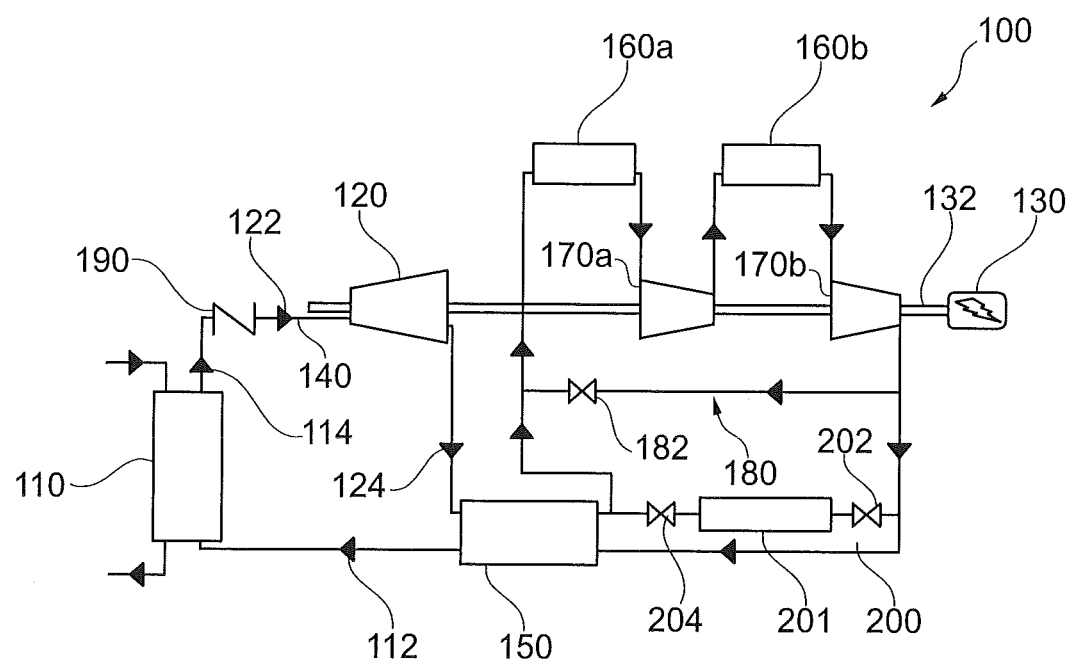
FIG. 2 is a schematic of an improved closed loop Brayton cycle, in accordance with embodiments of the present disclosure.

Referring to FIG. 2, a schematic of an improved closed loop Brayton cycle 100 (hereinafter referred to as 'cycle 100') is depicted in accordance with an exemplary embodiment of the present disclosure which includes a working fluid flowing therein for operation of the power plant. Exemplary embodiment as shown in FIG. 2 depicts the cycle 100 in its simplest form, which may include a heater 110, at least one turbine 120, a recuperator 150, at least one cooler 160a, 160b, at least one compressor, such as low pressure 170a, and high pressure 170b, a bypass line 180, an inventory control system 200 and a non-tight flap valve arrangement 190, in a closed loop in which the working fluid is circulated.

The heater 110 may be adapted to supply heat to the working fluid flowing in the cycle 100. The heater 110 includes an inlet 112 and an outlet 114. The heater 110 may be a gas heater that incorporates heating source to heat the working fluid flowing therethrough. In an embodiment, the heater 110 may be a nuclear reactor and the heating source may be Sodium. However, the invention is, of course, not limited to the use of a nuclear reactor as a heat source. Other suitable and conventional heat sources may be employed. Further, the working fluid may be gas.

Further, the turbine 120, coolers 160a, 160b and the compressors 170a, 170b, each of which may be a single stage or multiple stages, as desired. A shaft-line connection 132 or other suitable mechanical drive means couples the turbine 120 to the compressors 170a, 170b. Similarly, the shaft connection 132, having suitable seals, not shown, passes out of to a variable load 130, which may be a generator, for producing electrical power. The compressors 170a are 170b, which are driven by the turbine 120 are connected to the cooler 160a, 160b to receive and compress the working fluid.

Furthermore, the recuperator 150 is adapted to be connected to the turbine 120 via the outlet 124, to receive expanded working fluid from the turbine 120 to cool thereto up to an extent. The recuperator 150 is further connected to the heater 110 via the inlet 112 of the heater 110. The recuperator 150 is also connected to the cooler 160a (pre-cooler), where the cooled working fluid from the recuperator 150 is further cooled and transferred to the low pressure compressor 170a for being compressed. Depending upon the requirement, compressed fluid from the low pressure compressor 170a is further cooled into the cooler 160b (intercooler) and transferred to the high pressure compressor 170b for further compressing the cooled working fluid. Such high compressed and cooled working fluid is allowed to pass through the recuperator 150, where it receives the heat from the expanded working fluid from the turbine 120 to be heated up to an extent. The heated working fluid from the recuperator 150 is supplied to the heater 110 for further heating and being supplied to the turbine 120 for power generation via the generator 130.

The turbine 120 is operable to produce power to run the generator (130) and compressor (170a, 170b) arrangement for operation of the cycle 100 and to supply electricity to a grid depending upon the load requirement, i.e. full load, partial load, or no-load conditions. For example: at full load condition, the turbine 120 may generate 1300 Megawatt (MW) of power in which 700 MW of power may be utilised by the compressor 170a, 170b and remaining 600 MW is utilized by the generator 132 to produce the electricity and transfer it to grid. However, when there is decrease in load, the power required by the generator 132 will be lower, and accordingly an inventory control system 200 may be required.

As discussed above, the inventory control system 200 (inventory 200) may be utilised for slow power variation in the grid. The inventory 200 is configured parallel to the bypass line 180 around the compressor 170a, 170b. The inventory control system 200 may include a series of working fluid storage vessels 201, and valve arrangements 202, 204 to enable storage and release of the working fluid from the storage vessels 201, from and to compressor 170a, 170b, in response to change in load. As the grid load is reduced, working fluid will be withdrawn from the high pressure side of the compressors 170a, 170b into the vessels, and when the load is raised, the working fluid in the vessel 201 will be fed back to the low pressure side of the compressors 170a, 170b.

Also discussed above, in case of sudden substantive decrease in grid load, the bypass line 180 may be utilised. As described, the bypass line 180 may be configured around the compressors, here, around the compressors 170a and 170b. The bypass line 190 includes a valve arrangement 182 adapted to be regulated in response to change in load on the power plant. Specifically, as shown in FIG. 2, the outlet of the high pressure compressor 170b is connected to the inlet of the low pressure compressor 170b while passing through the pre-cooler 160a. When the load change occurs, the valve arrangement 182, which may be automatically controlled, opens, to allow the compressed gas to flow from the high pressure compressor 170b to the low pressure compressor 170b in the controlled manner, thereby bypassing the compressed working fluid to flow to the heater 110 and then to the turbine 120 to reduce the power output from the turbine, as described above. However, the bypass line 180, as discussed above, may lead to significant shaft line speed increase of about 20 percent of nominal speed.

Therefore, the improved control concept cycle 100 incorporates the non-tight flap valve arrangement 190. The non-tight flap valve arrangement 190 (flap valve 190) is configured on the each conduit 140 between the heater 110 and the turbine 120 in a closest possible proximity to each turbine inlet 122. The flap valve 190 may be closed, when the generator 130 is disconnected from the grid, and, to substantially reduce the driving torque of the turbine, either in combination with the bypass line 190 or alone. The flap valve 190 being not tight, keeps some venting flow inside the turbine 120 to avoid overheating due to windage effect.

The flap valve 190 is designed to minimize the pressure drop during normal operation and therefore don't impact significantly the cycle efficiency.

Figure 3A:
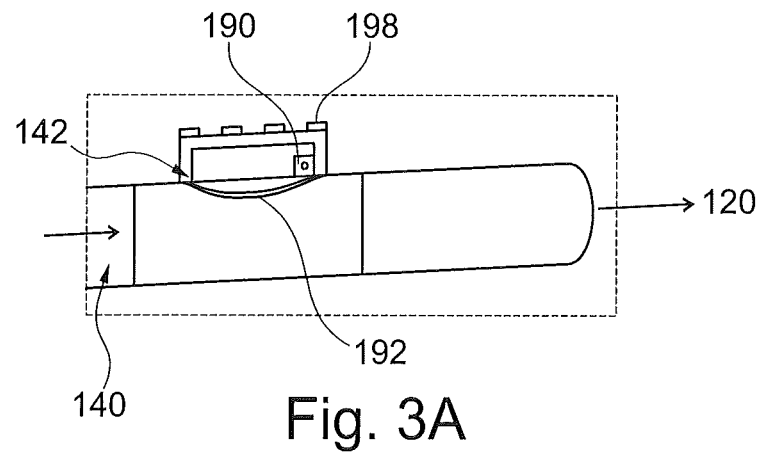
FIGS. 3A, 3B and 3C illustrate a non-tight valve arrangement and components thereof in closed and open positions in relation to a conduit, in accordance with additional embodiment of the present disclosure.
Figure 3B:
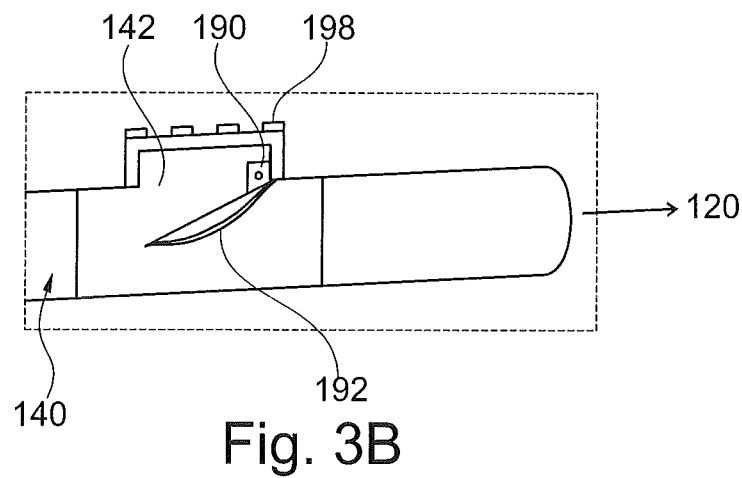
Figure 3C:
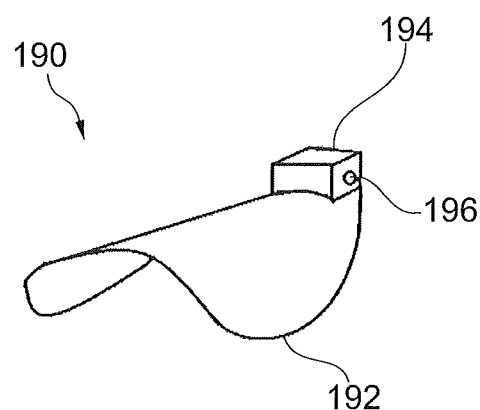

In accordance with the embodiment, as shown in FIGS. 3A, 3B and 3C, the flap valve 190 is adapted to be configured in the conduit 140. For such configuration, the conduit 140 includes a recess 142 where the flap valve 190 is housed in the recess 142, as shown in FIG. 3A and 3B, to minimize pressure drop In an embodiment, as shown in FIG. 3C, the flap valve 190 includes a flap member 192 and an attaching segment 194. The attaching segment 194 includes a flap axle 196 which pivotally attach the flap member 192. The attaching segment 194 is capable enabling the attachment of the flap valve arrangement 190 on the conduit 140 at the recess 142. In the closed position, the flap valve 190 is non-tight, in which the flap member 192 is configured to pivotally swing along the flap axel 196 that enables the flap member 192 to be partially opened, as per the requirement, to allow the working fluid with adjusted mass flow to pass from the conduit 140.

In an embodiment, when the generator 130 is connected to the grid (full load condition), as shown in FIG. 3A, the flap member 192 is at an open position, which completely housed the recess 142 and allows the working fluid to fully flow from the conduit 142 to the at least one turbine 120 to minimize pressure drop. Further, in an embodiment, upon the disconnection of generator from the grid (partial or no load condition), as shown in FIG. 3B, the flap member 192 is at closed position, in which it is non-tight, which allows the conduit 142 to be partially closed to enable the adjustment of the mass flow of working fluid to admit from the conduit 142 to the turbine 120 to avoid overheating due to windage.

In the cycle 100, upon the disconnection of the generator 130 from the grid, due to the non-tight flap valve arrangement 190, the resistive torque from the generator 130 suddenly disappears, and at the same time the driving torque of the turbine 120 is divided nearly by half due to inlet turbine 120 flow reduction due to the closure of the non-tight flap valve arrangement 190. As a consequence, the power balance between driving torque from turbine 120 and resistive torque from compressor 170a, 170b become significantly negative. Therefore, the shaft-line 132 speed may immediately be reduced and may almost experience no over speed.

In an embodiment, the flap member 192 is shaped to correspond the shape of the conduit 140. For example, if the shape of conduit 140 is cylindrical, the flap member 192 is also shaped to be cylindrical to minimize pressure drop during normal operation i.e. therefore it does not impact significantly the cycle efficiency.

In an embodiment, the flap valve arrangement 190 may be a self-closing flap valve arrangement that are adapted to be partially closed in responsive to sudden disconnection of the generator 130 for adjustment of the mass flow of working fluid to admit from the conduit 140 to the turbine 120. The self-closing flap valve arrangement may be controlled using an electronic module. For example, the electronic module may trigger closing of the flap valve 190 upon the signal corresponding to the disconnection of the generator 130 received from the grid.

In accordance with the embodiment, the cycle 100 further includes a covering arrangement 198 adapted to cover the recess and the flap valve arrangement 190 and block exiting of the working fluid from the cycle 100.

The cycle 100 of the present disclosure is advantageous in various scopes such as described above. The cycle may be capable of better control closed loop Brayton cycle and more precisely the shaft speed when the generator is suddenly disconnected from the grid. Based on the above description, due to the non-tight flap valve arrangement, the shaft-line experience almost no over speed in case of disconnection of the generator from the grid. In addition to above, the present invention also reduces or eliminates the large bypass valves with the associated piping as required in convention designs. Moreover, the compressor, cooler and intercooler do not experience large overflow due to such non-tight flap valve arrangement. The present system with the non-tight flap valve arrangement is capable of reducing within the driving torque of the turbine within a few hundreds of milliseconds.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An improved closed loop Brayton cycle for a power plant, the cycle having a working fluid flowing therein for operation, the cycle, comprising:
   a heater having an inlet and an outlet, the heater adapted to supply heat to the working fluid flowing in the cycle;
   at least one turbine operable on expansion of the heated working fluid, and drivingly connected to a variable load via a shaft-line, each of the at least one turbine having an inlet and an outlet, wherein each inlet of the at least one turbine is connected to the outlet of the heater via a conduit;
   a recuperator connected to the at least one turbine via each turbine outlet to receive expanded working fluid to cool thereto, and connected to the heater via the inlet of the heater;
   at least one cooler connected to the recuperator to further cool the working fluid;
   at least one compressor on the shaft-line and driven by the at least one turbine, the at least one compressor connected to the at least one cooler to receive and compress the working fluid to transfer to the recuperator to be heated by the expanded working fluid from the at least one turbine and supply to the heater; and
   a non-tight flap valve arrangement configured on each conduit between the heater and the at least one turbine in a closest possible proximity to each turbine inlet to manage the mass flow of working fluid through the non-tight flap valve arrangement to control the shaft-line speed when the variable load is disconnected from a power grid.

2. The cycle as claimed in claim 1, wherein the conduit comprises a recess where the non-tight flap valve arrangement is housed in the recess to substantially minimize pressure drop in the cycle upon normal operation.

3. The cycle as claimed in claim 2, wherein the non-tight flap valve arrangement comprises:
   a flap member; and
   an attaching segment having a flap axle to pivotally attach the flap member, the attaching segment enables the attachment of the non-tight flap valve arrangement on the conduit to be housed at the recess,
   wherein the flap member at an open position completely covers the recess and allows the working fluid to fully flow from the conduit to the at least one turbine, and
   wherein the flap member at closed position is non-tight, which allows the conduit to be partially closed to enable the adjustment of the mass flow of working fluid to admit from the conduit to the at least one turbine.

4. The cycle as claimed in claim 3, wherein the flap member is shaped to correspond the shape of the conduit to substantially minimize pressure drop in the cycle upon normal operation.

5. The cycle as claimed in claim 3, further comprising a covering arrangement adapted to cover the recess and the non-tight flap valve arrangement and block exiting of the working fluid from the cycle.

6. The cycle as claimed in claim 3, wherein the non-tight flap valve arrangement in closed position is non-tight, in which the flap member is configured to pivotally swing along the flap axel that enables the flap member to be partially opened to allow the working fluid with adjusted mass flow to pass from the conduit.

7. The cycle as claimed in claim 3, wherein the non-tight flap valve arrangement is a self-closing non-tight flap valve arrangement that is adapted to be partially closed in response to disconnection of the variable load from the power grid.

8. The cycle as claimed in claim 7, wherein the self-closing non-tight flap valve arrangement is controlled via an electronic module.

\* \* \* \* \*